United States Patent
Watanabe

(10) Patent No.: US 8,422,155 B2
(45) Date of Patent: Apr. 16, 2013

(54) SLIDING MEMBER STRUCTURE AND MANUFACTURING METHOD OF THE SAME

(75) Inventor: Takashi Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 181 days.

(21) Appl. No.: 12/777,843

(22) Filed: May 11, 2010

(65) Prior Publication Data

US 2010/0302658 A1     Dec. 2, 2010

(30) Foreign Application Priority Data

May 26, 2009   (JP) ................................ P2009-126399

(51) Int. Cl.
*G02B 7/02*   (2006.01)

(52) U.S. Cl.
USPC ......................................................... 359/826

(58) Field of Classification Search .................. 359/703, 359/704, 826
See application file for complete search history.

(56) References Cited

U.S. PATENT DOCUMENTS

| | | | | |
|---|---|---|---|---|
| 4,336,979 A | * | 6/1982 | Hamatani | 359/826 |
| 4,582,350 A | * | 4/1986 | Okajima | 285/390 |
| 5,084,022 A | * | 1/1992 | Claude | 604/164.13 |
| 5,657,173 A | * | 8/1997 | Imanari et al. | 359/825 |

FOREIGN PATENT DOCUMENTS

| JP | 11-160602 | * | 6/1999 |
|---|---|---|---|
| JP | 2005-83568 A | | 3/2005 |

* cited by examiner

*Primary Examiner* — Alicia M Harrington
(74) *Attorney, Agent, or Firm* — Birch, Stewart, Kolasch & Birch, LLP

(57) ABSTRACT

A sliding member structure is stably operated by preventing rattling and achieves a decrease in cost. A male helicoid is provided in a fixed barrel, and a female helicoid is provided in a focus barrel. The focus barrel is made of a light-transmissive resin. The fixed barrel is made of a sliding material to which a curable material is not fixed. The fixed barrel and the focus barrel are set by a fixture to dispose the male helicoid and the female helicoid with a predetermined clearance, and the curable material is filled into the clearance between the male helicoid and the female helicoid. The curable material is cured by irradiating UV rays. A cured material layer is formed on a surface of the male helicoid.

10 Claims, 12 Drawing Sheets

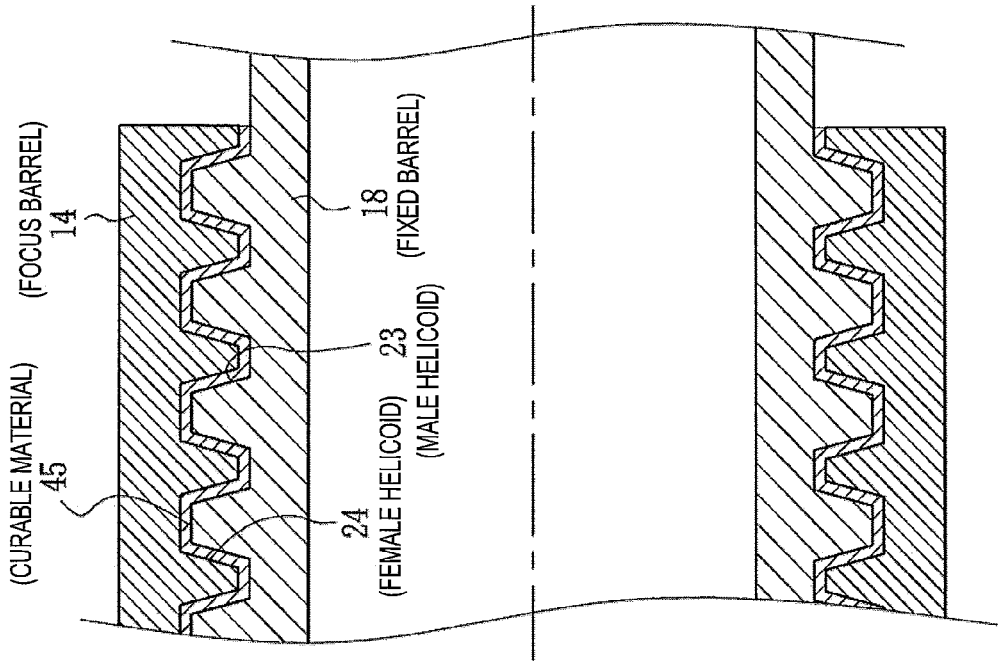
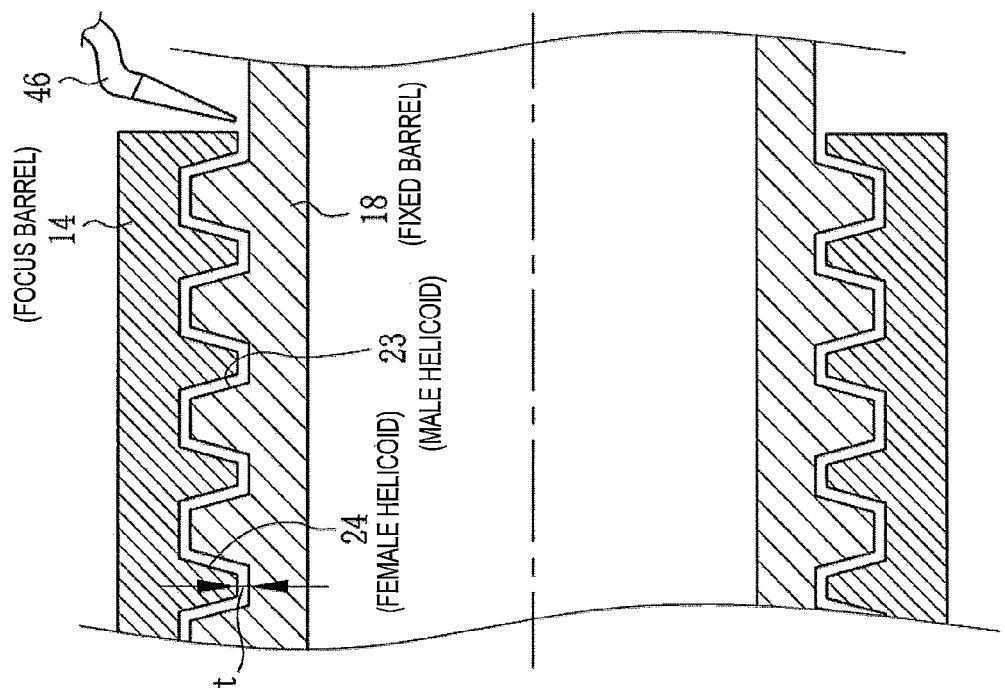

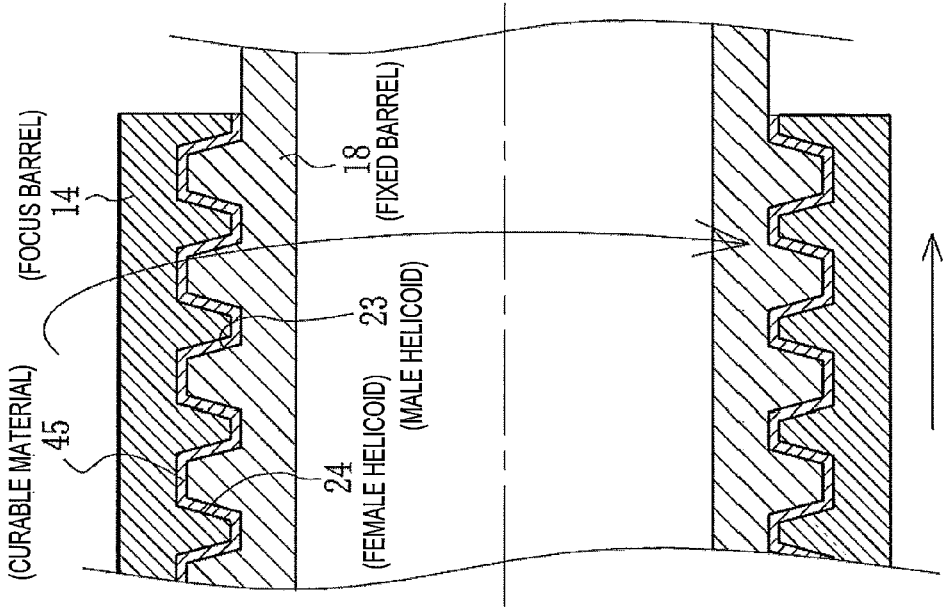
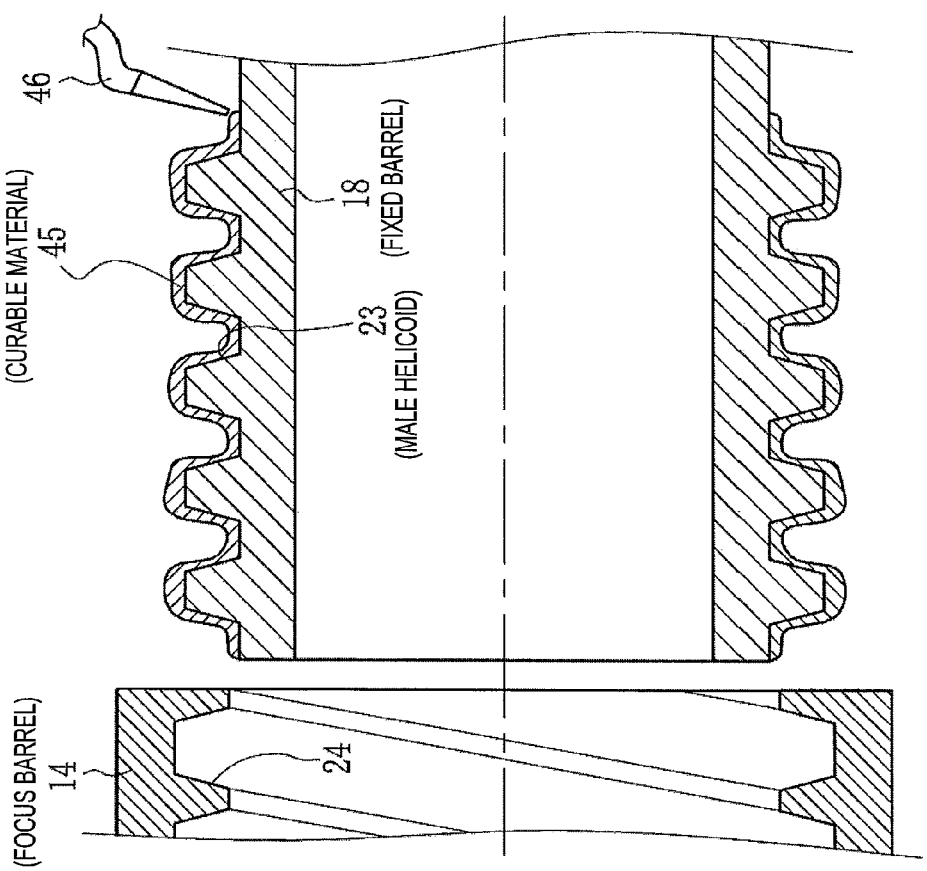

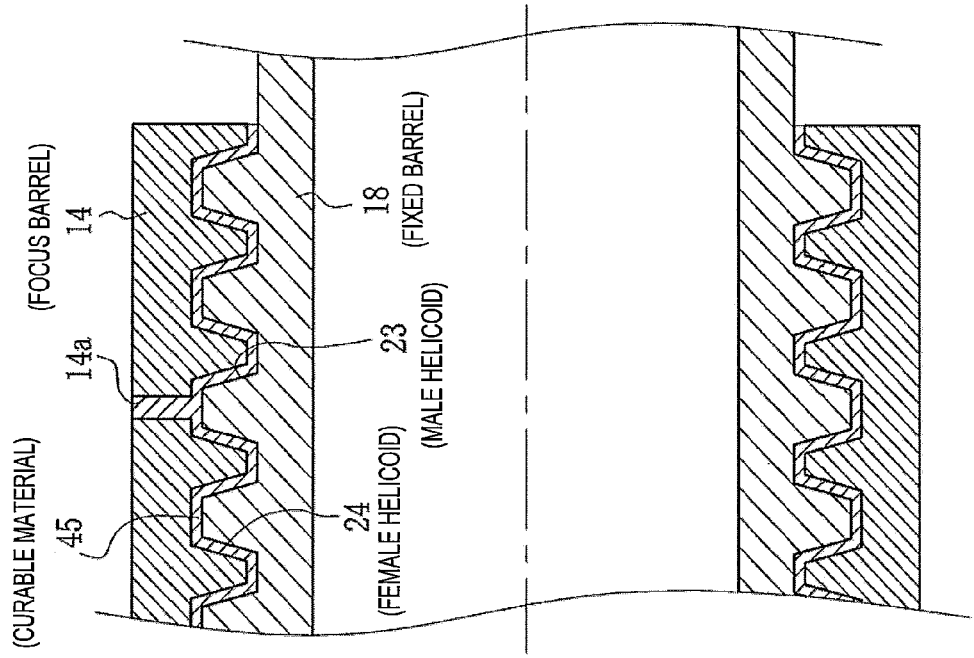
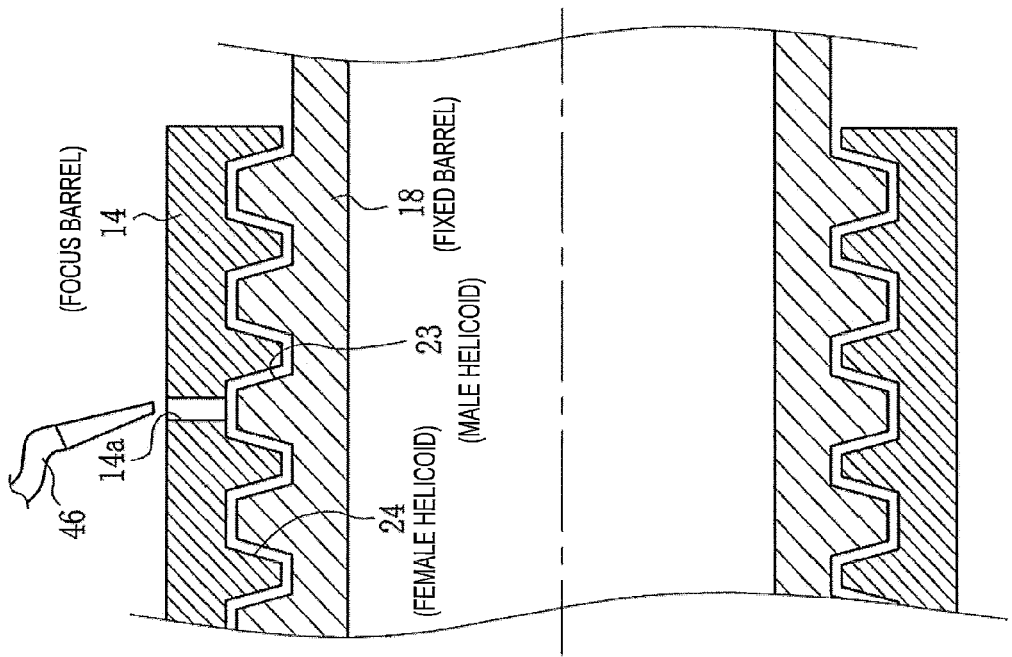

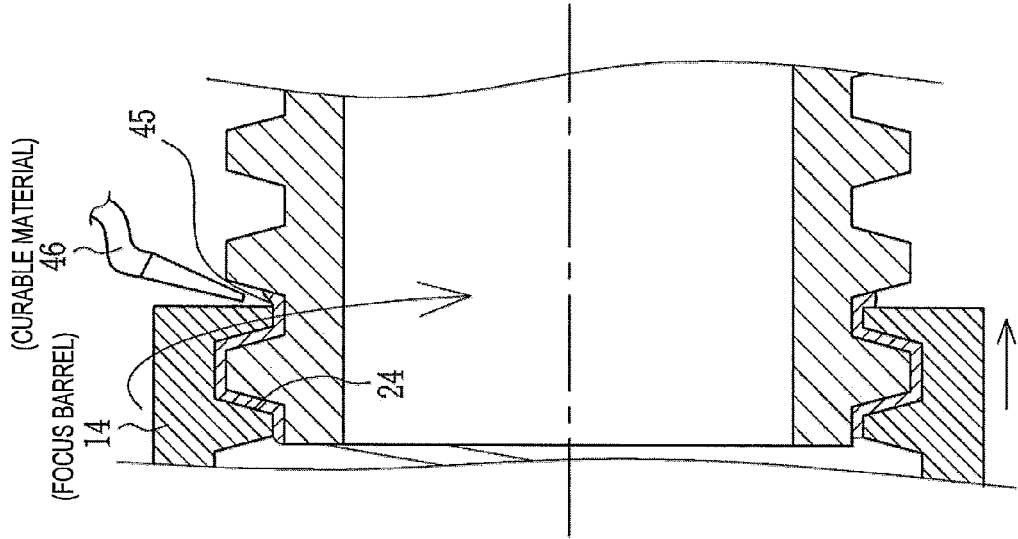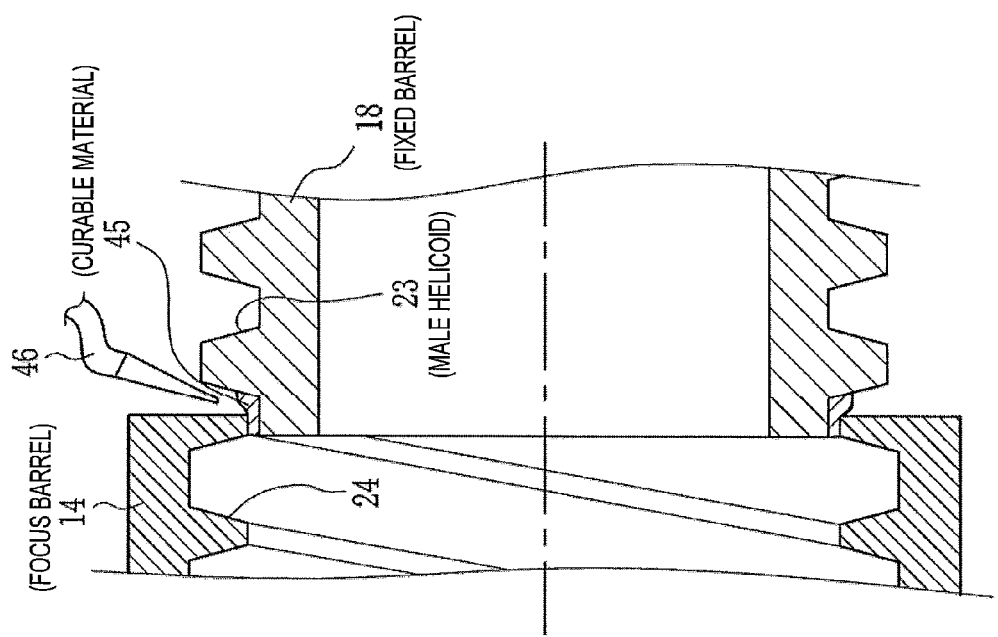

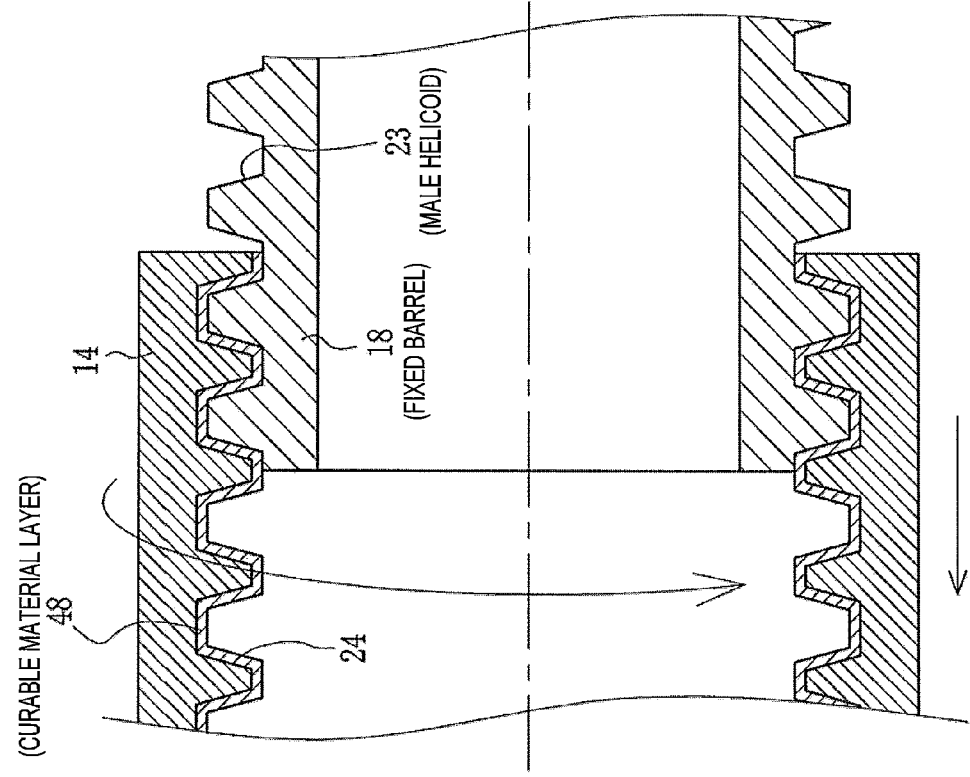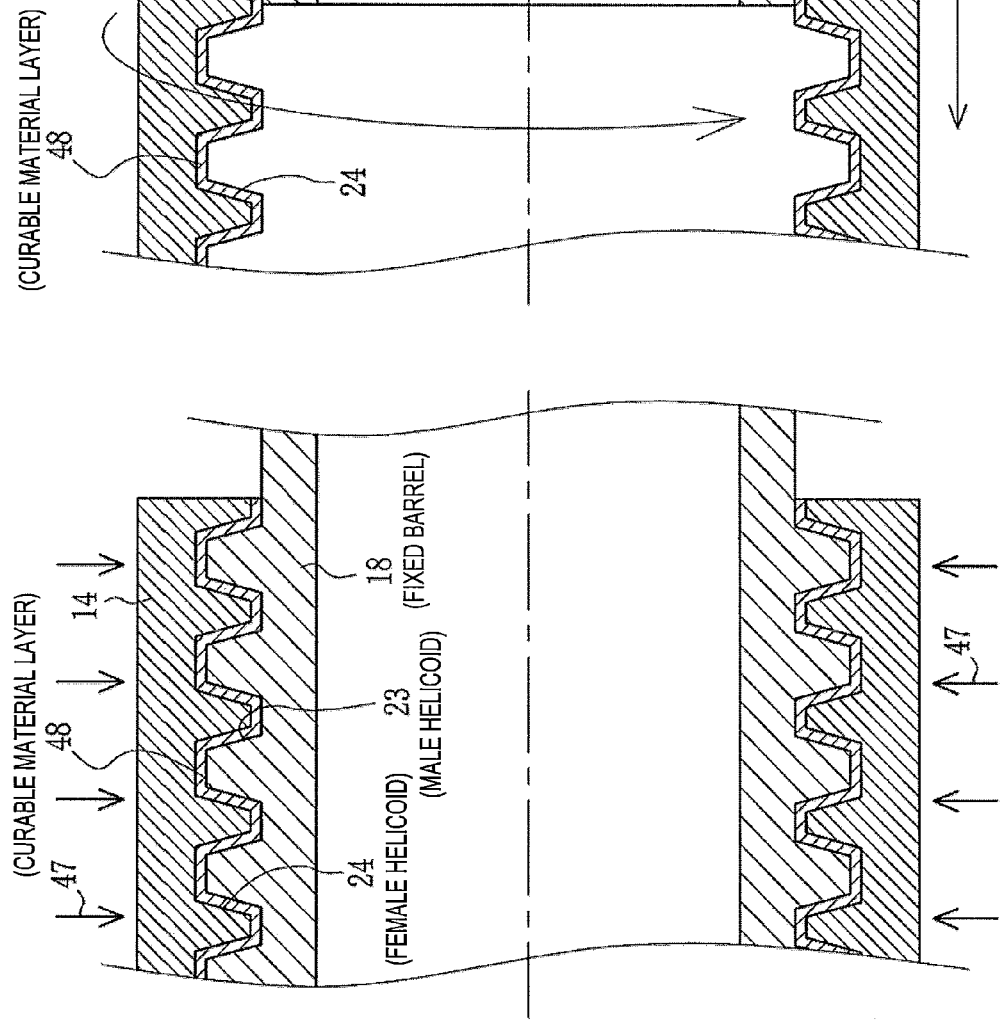

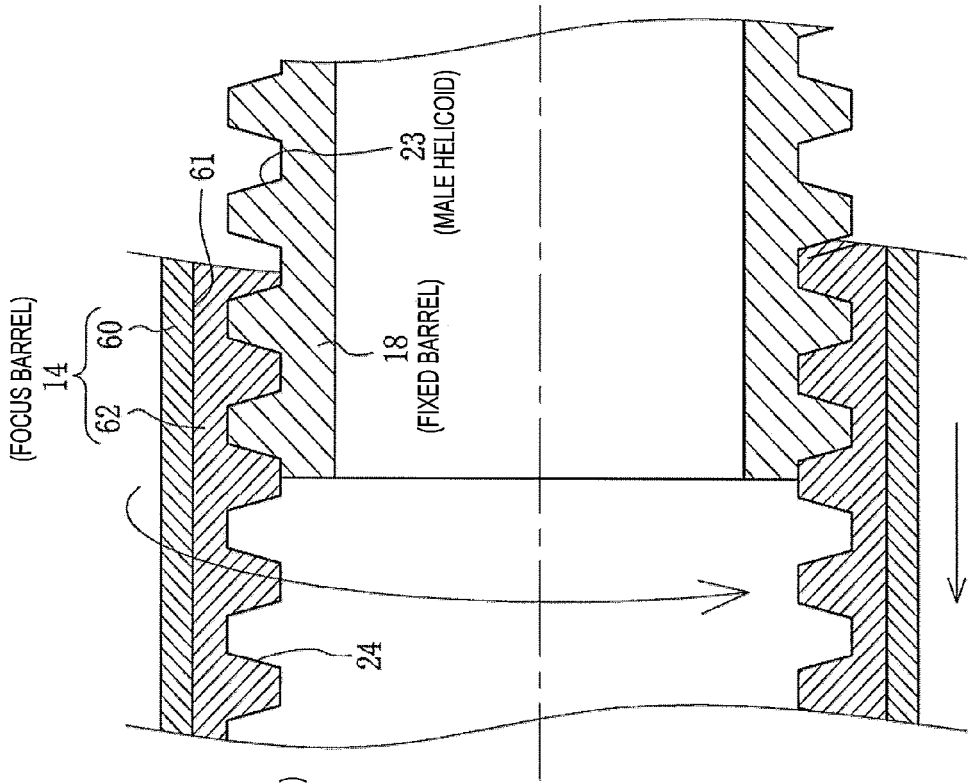
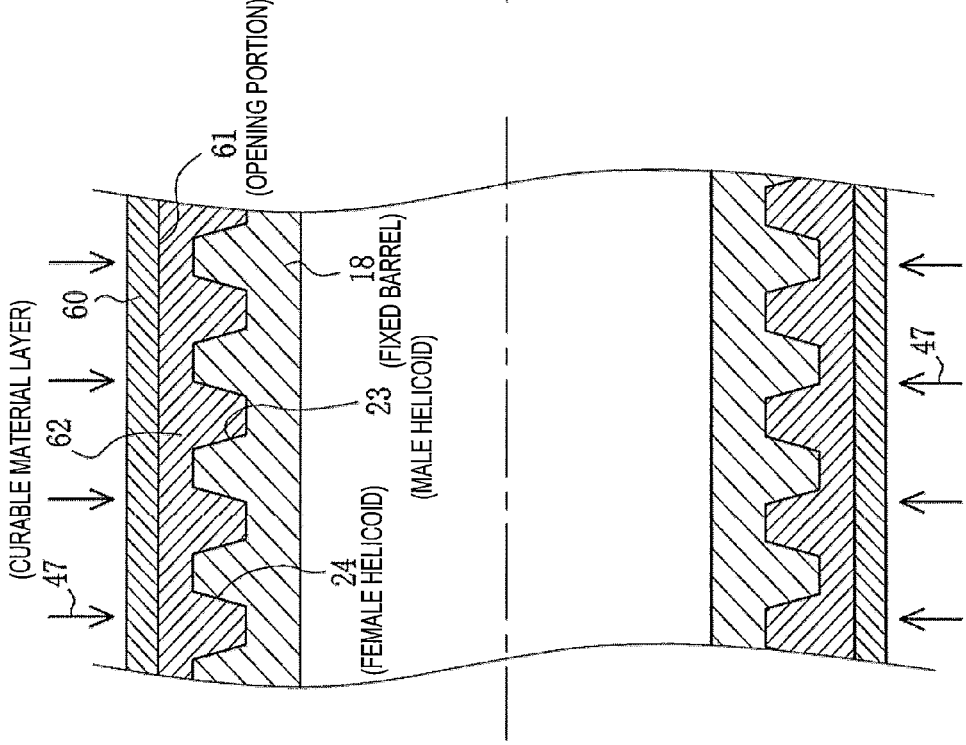

SLIDING MEMBER STRUCTURE AND MANUFACTURING METHOD OF THE SAME

CROSS-REFERENCE TO RELATED APPLICATIONS

This application is based upon and claims the benefit of priority from the Japanese Patent Application No. 2009-126399 filed on May 26, 2009; the entire contents of which are incorporated herein by reference.

BACKGROUND OF THE INVENTION

1. Field of the Invention

The present invention relates to a sliding member structure which is used for, for example, a lens barrel and in which one member and another member slidably move relative to each other, and a manufacturing method of the same.

2. Description of the Related Art

Hitherto, as a structure in which one member and another member slidably move relative to each other, for example, there have been known a helicoid structure including a male helicoid (male screw) and a female helicoid (female screw), a structure including a ball screw and a nut, and a structure including a fixed barrel and a movable barrel as extension-type lens barrels. The helicoid structure is a mechanism for converting rotational movement to linear movement. The male helicoid is configured by forming a single or a plurality of screw threads in a trapezoidal or triangular cross-sectional shape along a helical path determined in advance. The helical path is determined depending on a movement distance (lead) in a rotational axis direction for a rotational degree. The female helicoid is provided with screw grooves screwed together with the screw threads of the male helicoid.

The helicoid structure is used for an optical system for moving a lens in an optical axis direction in an optical device such as a projection-type projector or a camera. For example, when the helicoid structure is used for a barrel of a camera, an inner barrel (helicoid member) having a male helicoid on its outer periphery and an outer barrel (helicoid member) having a female helicoid screwed together with the male helicoid on its inner periphery are provided, and one barrel is moved relative to the other barrel in the optical axis direction by rotating the barrels relative to each other. The helicoid members using this kind of helicoid structure are generally manufactured by injection molding using synthetic resin materials which are advantageous in terms of low cost and mass production.

Since the screw threads and screw grooves of the helicoid members have small pitches and have complex shapes, when they are manufactured by injection molding, contraction, shrinkage, or the like occurs. When a large degree of contraction or shrinkage occurs, dimensional precision is degraded, and rattling may occur between the male and female helicoids. When rattling occurs in an optical device which applies the helicoid structure and has a configuration in which, for example, a focus lens group and remaining lens groups are moved relative to each other, optical characteristics may be deteriorated.

Here, for helicoid members disclosed in JP-A-2005-83568, a lubricating material such as grease is applied to a clearance between male and female helicoids to suppress rattling. In addition, for the helicoid members disclosed in JP-A-2005-83568, with regard to a plurality of screw threads or screw grooves of at least one of the male and female helicoids, a single screw thread or screw groove is not provided to increase the clearance between the male and female helicoids and insert the lubricating material into the clearance.

In addition, two-color molding for forming only contact surfaces of the male and female helicoids using a soft resin material such as an elastomer and forming other parts thereof using a hard resin material so as to allow the male and female helicoids to come in close contact with each other during screwing is considered. Otherwise, pressing the male and female helicoids against each other using a biasing member such as a spring to suppress rattling is considered.

However, in the helicoid members disclosed in JP-A-2005-83568, properties including hardness and viscosity of the lubricating material such as grease vary due to environmental temperature or circumstances. Therefore, when the helicoid structure is operated, due to relative positions of the male and female helicoids or positions of the center of gravity of the helicoids, points with slight rattling and points with considerable rattling coexist, so that the helicoid structure cannot be stably operated.

In addition, in the configuration in which the helicoid members are allowed to come in close contact with each other by the biasing member, the helicoid members can be relatively easily pressed against each other in the axis direction. However, structurally, it is difficult to press the helicoid members against each other in a radial direction along the entire periphery, and the number of components and processes to assemble the biasing member is further increased, resulting in an increase in cost.

In addition, in the method of manufacturing the helicoid members using the two-color molding in which only the contact surfaces or the vicinity thereof of the male and female helicoids are made of the soft resin, a shrinkage ratio is high, and dimensional precision is degraded. Furthermore, when one helicoid member of the male and female helicoids is subjected to two-color molding and the other helicoid member is subjected to one-color molding, a combination of resins having different shrinkage ratios is produced. Therefore, in order to screw the two helicoid members together with good precision by controlling molding shrinkage, a number of tests need to be performed, which results in an increase in cost.

SUMMARY OF THE INVENTION

In view of the above circumstances, an object of the invention is to stably operate a sliding member structure by preventing rattling and reducing costs.

According to an aspect of the invention, there is provided a sliding member structure including: one member and the other member that slidably come in contact with each other to move relative to each other, wherein a surface of the one member in a range opposed to the other member is made of a sliding material to which a curable material is not fixed, the other member is opposed to the one member with a predetermined clearance therebetween, and a cured material layer which is formed by curing the curable material charged into at least a part of the clearance between the one member and the other member, and is fixed to a surface of the other member to slidably come in contact with the one member, is provided.

The curable material may be a photocurable adhesive which is cured by a predetermined wavelength range of light, and one or both of the one member and the other member may transmit the predetermined wavelength range of light. Otherwise, the curable material may be a thermosetting resin that is cured when heated to a predetermined temperature, and the one member and the other member may have heat resistance to bear the predetermined temperature.

The one member may be formed integrally with the sliding material. Otherwise, the one member may be configured by a main body and a sliding material layer formed on a surface of the main body. In addition, a surface of the other member, which is opposed to the one member, may be subjected to a roughening process.

According to another aspect of the invention, there is provided a sliding member structure including: one member and the other member that slidably come contact with each other to move relative to each other, wherein the one member is made of a sliding material of which a surface in a range opposed to the other member is not fixed with a curable material, and wherein the other member includes: a main body that is opposed to the one member with a predetermined clearance therebetween, and a cured material layer which is configured by charging a curable material between the one member and the main body and curing the curable material, and is fixed to a surface of the other member main body to slidably come in contact with the one member.

The one member and the other member may constitute a helicoid structure in which male and female screws are screwed together to rotate relative to each other so as to allow the one member and the other member to move relative to each other in a rotation axis direction.

According to another aspect of the invention, there is provided a manufacturing method of a sliding member structure including one member and the other member that slidably come in contact with each other to move relative to each other, the manufacturing method including: forming the one member so that a surface of the one member in a range opposed to the other member has a sliding material layer to which a curable material is not fixed; opposing the one member and the other member with a predetermined clearance therebetween and charging the curable material that has fluidity between the one member and the other member; and curing the curable material to be fixed to a surface of the other member to form a cured material layer which slidably comes in contact with the one member.

According to the aspects of the invention, the curable material is charged into at least a part of the clearance between the one member and the other member and is cured to form the cured material layer that is fixed to the surface of the other member and slides on the one member. Therefore, rattling between the one member and the other member is eliminated, so that the sliding member structure can be stably operated, and a decrease in cost can be achieved.

BRIEF DESCRIPTION OF THE DRAWINGS

FIGS. 3A and 3B are explanatory views showing processes of setting one member and the other member with a fixture, and charging a curable material.

FIGS. 4A and 4B are explanatory views showing processes of applying the curable material to the one member and screwing the one member together with the other member to charge the curable material into a clearance therebetween.

FIGS. 5A and 5B are explanatory views showing processes of injecting the curable material from a through-hole provided in the other member and charging the curable material into the clearance.

FIGS. 6A and 6B are explanatory views showing an example of repeating processes of charting the curable material into the clearance between the one member and the other member and screwing the one member and the other member together by rotating the other member by a predetermined angle.

FIGS. 7A and 7B are explanatory views showing a process of curing the curable material and a state of separating a helicoid member after the curing.

FIGS. 10A and 10B are explanatory views showing processes of curing a curable material and separating the other member after the curing.

DESCRIPTION OF THE PREFERRED EMBODIMENTS

Figure 1:
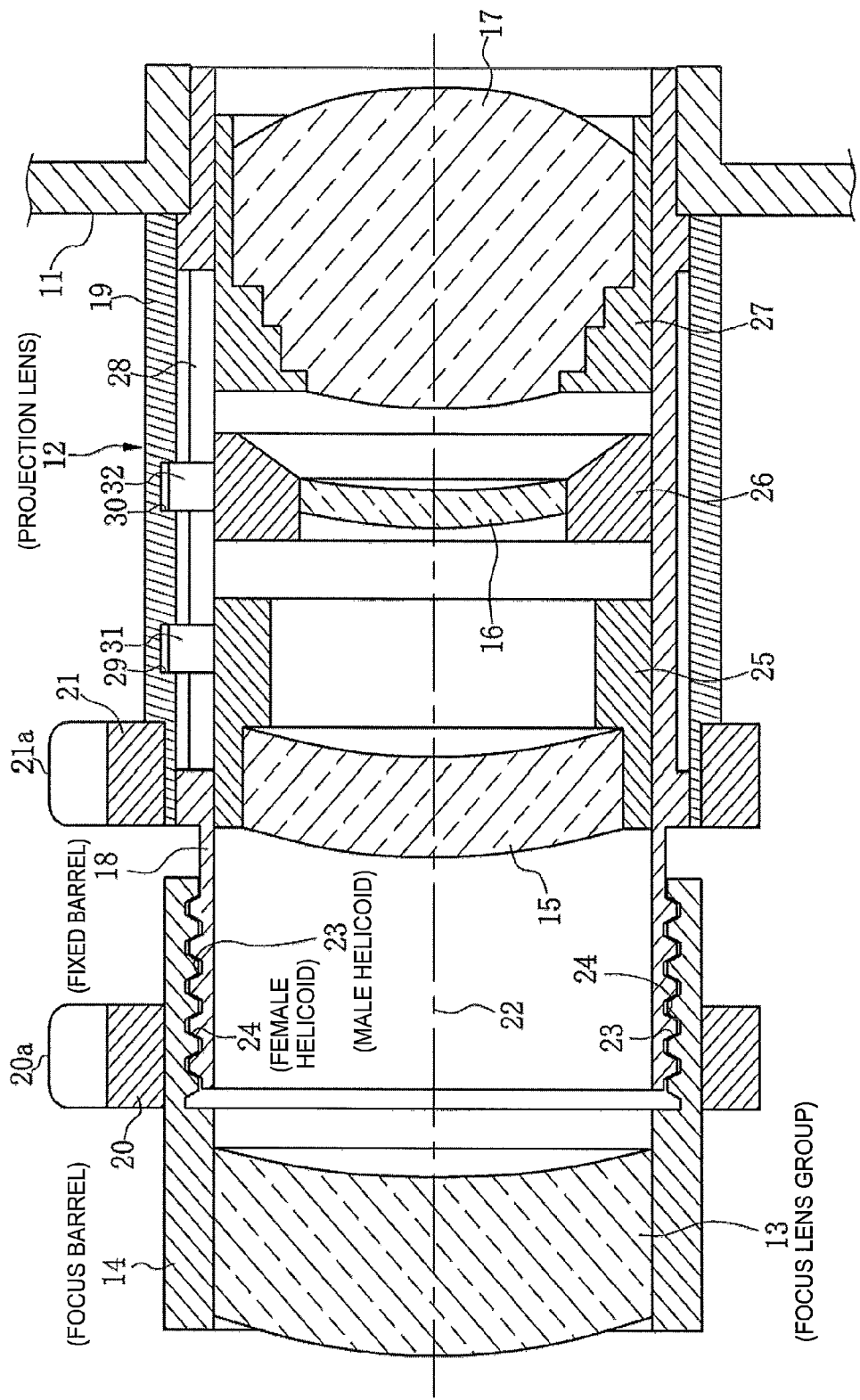
FIG. 1 is a cross-sectional view of a main part of a projection lens.

FIG. 1 illustrates a configuration of a projection lens 12 to which an embodiment of the invention. The projection lens 12 is mounted in a device main body 11 of an optical device or the like. The projection lens 12 is of a front focus adjustment type, and includes a focus barrel (the other member) 14 into which a focus lens group 13 is assembled, a second lens group 15, a third lens group 16, a fixed barrel (one member) 18 into which a fourth lens group 17 is assembled, a cam barrel 19, a focus ring 20 fixed to the focus barrel 14, and a zoom ring 21 fixed to the cam barrel 19. The focus lens group 13 is assembled into a front portion of the focus barrel 14.

The projection lens 12 performs focusing as the focus lens group 13 is moved in an optical axis direction by rotating the focus ring 20, and performs zooming as the second and third lens groups 15 and 16 are moved in the optical axis direction by rotating the zoom ring 21.

The fixed barrel 18 is formed in a cylindrical shape. The focus barrel 14 is formed in a cylindrical shape having an inner diameter along an outer diameter of the fixed barrel 18 and is fitted to an outside of a front end of the fixed barrel 18. The focus barrel 14 and the fixed barrel 18 are manufactured by a manufacturing method described later.

An outer periphery of the front portion of the fixed barrel 18 is provided with a male helicoid 23 having a screw thread in a trapezoidal cross-sectional shape along a helical path determined in advance. An inner periphery of a rear portion of the focus barrel 14 is provided with a female helicoid 24 screwed together with the male helicoid 23. The focus barrel 14 and the fixed barrel 18 are helicoidally joined to each other through the female and male helicoids 24 and 23.

When an operation protrusion 20a is held and operated to rotate the focus ring 20, the focus barrel 14 is rotated by the operation of the female and male helicoids 23 and 24 screwed together to be moved along the fixed barrel 18 in the optical axis direction. Accordingly, the focus lens group 13 is moved in the optical axis direction for focusing.

The second lens group 15 is held in a lens range 25. The third lens group 16 is held in a lens range 26. The fourth lens group 17 is held in a lens range 27. The lens ranges 25 to 27 are formed in cylindrical shapes that have inner diameters according to outer diameters of the respective lens groups 15 to 17 and have outer diameters according to an inner diameter of the fixed barrel 18. The lens ranges 25 and 26 are fitted and assembled to an inside of the fixed barrel 18 so as to move in the optical axis direction. The lens range 27 is fixed to the inside of the fixed barrel 18. In addition, the lens ranges 25 to 27 are made of a metal material such as aluminum.

The fixed barrel 18 is provided with a straight cam groove 28 along an optical axis 22. An inner periphery of the cam barrel 19 is provided with rotational cam grooves 29 and 30 in a circumferential direction. An outer periphery of the lens range 25 is provided with a cam follower 31 which is inserted into the rotational cam groove 29 through the straight cam groove 28. An outer periphery of the lens range 26 is provided with a cam follower 32 which is inserted into the rotational cam groove 30 through the straight cam groove 28.

When an operation protrusion 21a is held and operated to rotate the zoom ring 21, the cam barrel 19 is rotated. When the cam barrel 19 is rotated, the cam followers 31 and 32 of which rotation is restricted by the straight cam groove 28 are pressed by the corresponding rotational cam grooves 29 and 30, and the lens ranges 25 and 26 are moved in the optical axis direction along the straight cam groove 28 and the fixed barrel 18. Accordingly, the second and third lens groups 15 and 16 are moved in the optical axis direction for zooming.

Figure 2:
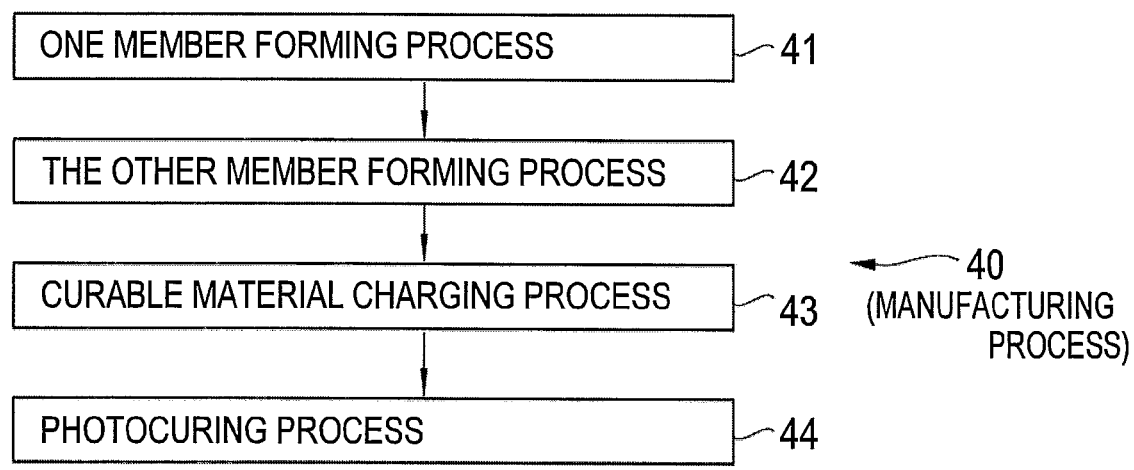
FIG. 2 is a process view showing a manufacturing process of a sliding member structure.

A manufacturing process of a sliding member structure including the focus barrel 14 and the fixed barrel 18 to which the embodiment of the invention will be described with reference to FIGS. 2 to 7. In addition, FIGS. 3A to 7B schematically illustrate a configuration in the vicinity of the male and female helicoids 23 and 24 during the manufacturing process of the focus barrel 14 and the fixed barrel 18, and thickness of the focus barrel 14 and the fixed barrel 18 are exaggerated for visual clarity. As illustrated in FIG. 2, in the manufacturing process 40 of the focus barrel 14 and the fixed barrel 18, first, a one member forming process 41 for forming the fixed barrel 18 in one body from a sliding material using injection molding is performed. As the sliding material, a material to which a curable material described later is not to be attached, for example, POM (polyacetal) or PBT (poly-butylene terephthalate) may be used.

Next, a the other member forming process 42 for forming the focus barrel 14 is performed. In the method of forming the focus barrel 14, a light-transmissive resin for transmitting UV (ultraviolet) rays, for example, PMMA (polymethyl methacrylate) is used. In this embodiment, the focus barrel 14 is formed in the process 42 so that an inner diameter of the female helicoid 24 is greater than an outer diameter of the male helicoid 23 to provide a predetermined clearance from the female helicoid 23 of the fixed barrel 18 (see FIG. 3A). In addition, the clearance t is in the range of, for example, 20 to 30 μm.

In addition, it is preferable that a process for roughening the female helicoid 24 of the focus barrel 14 (the other member) be performed during the other member forming process 42 or between the processes 42 and 43. As the roughening process, for example, a sandblasting process is performed.

In a curable material filling process 43, a curable material having fluidity is filled into the clearance between the focus barrel 14 and the fixed barrel 18 formed in the processes 41 and 42. In the method for filling the curable material 45 in the curable material filling process 43, first, the focus barrel 14 and the fixed barrel 18 are set by a fixture or the like so as to be fixed (a state illustrated in FIG. 3A). Here, the male and female helicoids 23 and 24 are screwed together over the entire ranges, and the male and female helicoids 23 and 24 are opposed to each other with a clearance therebetween. Here, from a rear end of the focus barrel 14, the clearance between the male and female helicoids 23 and 24 is exposed. In addition, while maintaining this state, the curable material 45 is filled into the clearance between the male and female helicoids 23 and 24 from the rear end of the focus barrel 14 (a state illustrated in FIG. 3B). As the curable material 45 for filling the clearance, a UV-curable adhesive is used. Reference numeral 46 of FIG. 3A denotes a nozzle for injecting the curable material 45 into the clearance. In addition, in the method illustrated in FIGS. 3A and 3B, the curable material 45 is filled from the rear end of the focus barrel 14. However, in a case where the clearance between the male and female helicoids 23 and 24 is exposed from a front end of the focus barrel 14, the curable material 45 is filled from the front end thereof.

The method of filling the curable material 45 between the focus barrel 14 and the fixed barrel 18 in the curable material filling process 43 is not limited to the above-mentioned method. For example, as illustrated in FIGS. 4A and 4B, first, the focus barrel 14 and the fixed barrel 18 are unscrewed to be separated coaxially with each other, and the curable material 45 is applied onto the male helicoid 23 of the fixed barrel 18 (a state illustrated in FIG. 4A). When the curable material filling process 43 is performed by this method, the focus barrel 14 is rotated in a direction to be screwed together with the fixed barrel 18 from this state and relatively moved in a rotational axis direction. Then, the curable material 45 is filled into the clearance between the male and female helicoids 23 and 24 while moving the male and female helicoids 23 and 24 relative to each other to such a position that they are screwed together over the entire ranges (a state illustrated in FIG. 4B).

In addition, as another method, as illustrated in FIGS. 5A and 5B, a through-hole 14a which penetrates from an outer peripheral surface of the focus barrel 14 to the female helicoid 24 is formed in advance, and the focus barrel 14 and the fixed barrel 18 are set by a fixture or the like so as to be fixed (a state illustrated in FIG. 5A). Here, the female helicoid 24 is screwed together with the male helicoid 23 over the entire range with a predetermined clearance. In addition, while maintaining this state, the curable material 45 is injected from the through-hole 14a to fill the clearance between the focus barrel 14 and the fixed barrel 18, that is, the clearance between the male and female helicoids 23 and 24 with the curable material 45 (a state illustrated in FIG. 5B). Here, the curable material 45 is filled also in the through-hole 14a to fill the through-hole 14a. When this method is used, the number of through-holes 14a formed in the focus barrel 14 is not limited to one, and a plurality of through-holes 14a may be formed. For example, a through-hole 14a may be provided for each pitch of the female helicoid 24. In addition, it is preferable that the through-hole 14a be formed to be positioned on an upward side when the focus barrel 14 and the fixed barrel 18 are set. Accordingly, the curable material 45 injected from the through-hole 14a on the upward side flows under its own weight to reach a downward side so as to be filled.

Furthermore, as another method, as illustrated in FIGS. 6A and 6B, first, the focus barrel 14 and the fixed barrel 18 are disposed coaxially with each other so that end portions of the male and female helicoids 23 and 24 are screwed together (a state illustrated in FIG. 6A). Then, the curable material 45 is filled into a clearance between the screwed portions of the male and female helicoids 23 and 24. After filling the curable material 45 to the screwed portions of the male and female helicoids 23 and 24, the focus barrel 14 is rotated by a predetermined angle in a direction to be screwed together with the fixed barrel 18. Accordingly, the screwed portions are increased by a predetermined degree by relatively moving the focus barrel 14 in the rotation axis direction. Then, the curable material 45 is filled into the clearance of between the screwed portions increased by the predetermined degree (a state illustrated in FIG. 6B). Thereafter, a process of rotating the focus barrel 14 relative to the fixed barrel 18 by a predetermined angle to increase the screwed portions, and a process of filling the curable material 45 to fill the clearance between the screwed portions are repeated to move the male and female helicoids 23 and 24 relative to each other to such a position that they are screwed together over the entire range, resulting in a state where the curable material 45 is filled into the clearance between the male and female helicoids 23 and 24. As described above, by repeating the rotation of the focus barrel 14 and the filling of the curable material 45, the curable material 45 can be filled to reach the entire sites of the male and female helicoids 23 and 24. In addition, as a modified example of this method, the curable material 45 may be filled into the clearance between the screwed portions while rotating the focus barrel 14 at a predetermined angular velocity in a direction to be screwed together with the fixed barrel 18.

After the curable material filling process 43, in a subsequent photocuring process 44, UV rays 47 are irradiated from the outside of the focus barrel 14 to cure the curable material (a state illustrated in FIG. 7A). As described above, since the focus barrel 14 is made of the light-transmissive resin material, the UV rays transmit the focus barrel 14 and cure the curable material 45 filled between the male and female helicoids 23 and 24. Since the fixed barrel 18 is made of the sliding material, the curable material 45 is fixed only to the female helicoid 24. As described above, by roughening the female helicoid 24, the curable material 45 is strongly attached to the focus barrel 14. Accordingly, a cured material layer 48 which is made of the curable material 45 and is engaged with the male helicoid 23 is formed on the surface of the male helicoid 24. In addition, the curable material 45 slightly shrinks when cured by the photocuring process 44.

By performing the above-mentioned processes, the focus barrel 14 and the fixed barrel 18 are formed. After the photocuring process 44, when the male and female helicoids 23 and 24 are rotated relative to each other in a direction to be unscrewed from each other, the focus barrel 14 and the fixed barrel 18 are separated from each other (a state illustrated in FIG. 7B). Thereafter, the lens groups 13, 15 to 17, the cam barrel 19, the focus ring 20, the zoom ring 21, the lens ranges 25 to 27, the cam followers 31 and 32, and the like are assembled to the focus barrel 14 and the fixed barrel 18.

As described above, the cured material layer 48 is formed in the focus barrel 14 by curing the curable material 45 filled between the male and female helicoids 23 and 24, and simultaneously, the fixed barrel 18 including the male helicoid 23 is formed of the sliding material to be separated from the cured material layer 48. Therefore, when focusing is performed by operating the helicoid structure of the projection lens 12, the male and female helicoids 23 and 24 come in close contact with each other through the cured material layer 48, and since the male helicoid 23 is slidable on the cured material layer 48, the focus barrel 14 and the fixed barrel 18 are smoothly and stably rotated relative to each other without rattling, thereby moving the focus barrel 14 straightly along the optical axis direction with respect to the fixed barrel 18. In addition, unlike the existing manufacturing method, two-color molding or biasing members are not needed, so that the invention is effective in terms of low cost.

In addition, according to the first embodiment, the cured material layer 48 is formed by curing the curable material 45 filled over the entire ranges of the male and female helicoids 23 and 24. However, the cured material layer may be formed to eliminate rattling between the male and female helicoids 23 and 24, or the cured material layer may be formed by filling the curable material into at least a part of the clearance between the male and female helicoids 23 and 24.

In the first embodiment, the fixed barrel 18 (one member) and the focus barrel 14 (the other member) are allowed to come in close contact with each other through the cured material layer 48 by forming the cured material layer 48 between the fixed barrel 18 and the focus barrel 14. However, the invention is not limited thereto, and in a second embodiment described below, a resin material is filled between the one member and a main body of the other member to form the other member that slidably comes in contact with the one member.

Figure 8:
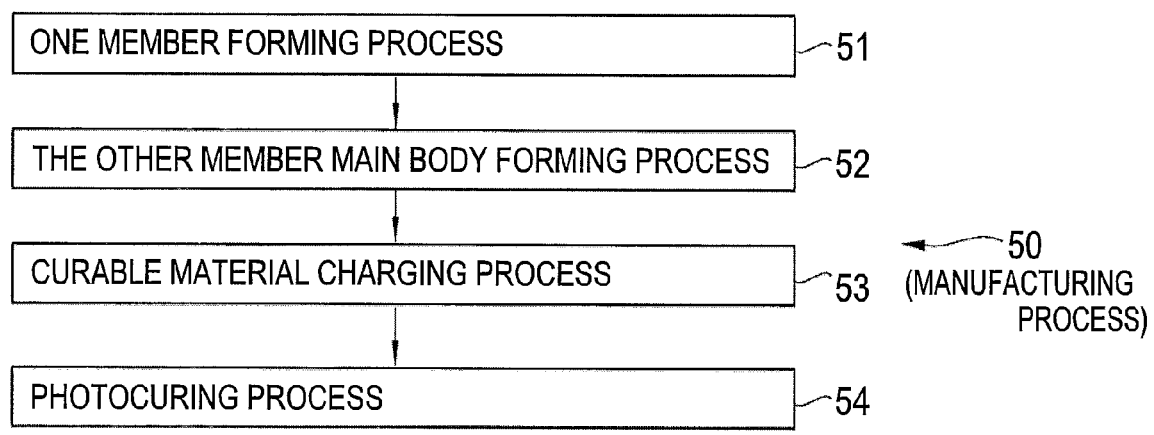
FIG. 8 is a process view showing a manufacturing process according to a second embodiment.

A manufacturing process of a helicoid structure to which the second embodiment is applied will be described with reference to FIGS. 8 to 10. As illustrated in FIG. 8, in the manufacturing process 50, first, the fixed barrel 18 is formed by a one member forming process 51. In the one member forming process 51, the fixed barrel 18 made of the same sliding member as that of the process 41 of the first embodiment. Next, in a the other member main body forming process 52, a focus barrel main body 60 (the main body of the other member) which is to be a main body of the focus barrel 14 is formed. On an inner periphery of a rear portion of the focus barrel main body 60, there is no female helicoid 24, and instead, an opening portion 61 having an inner diameter greater than the outer diameter of the male helicoid 23 is formed. The other parts thereof are the same as those of the focus barrel 14 of the first embodiment, and the focus barrel main body 60 is formed by injection molding using the same light-transmissive resin material. The opening portion 61 is notched in a circumferential pattern to penetrate through an inside of the focus barrel main body 60 from a rear end surface thereof. In addition, it is preferable that a process for roughening the opening portion 61 of the focus barrel main body 60 (the main body of the other member) be performed during the other member forming process 52 or between the processes 52 and 53. As the roughening process, for example, a sandblasting process is performed.

Figure 9A:
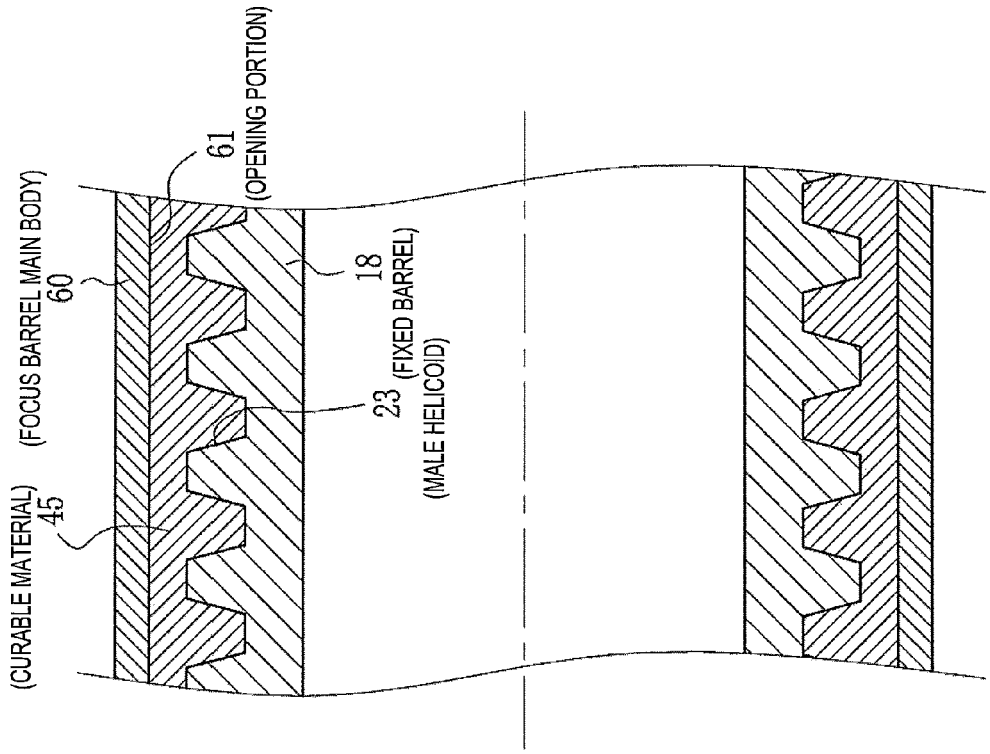
FIGS. 9A and 9B are explanatory views showing processes of setting one member and a the other member main body with a fixture and charging the curable material.
Figure 9B:
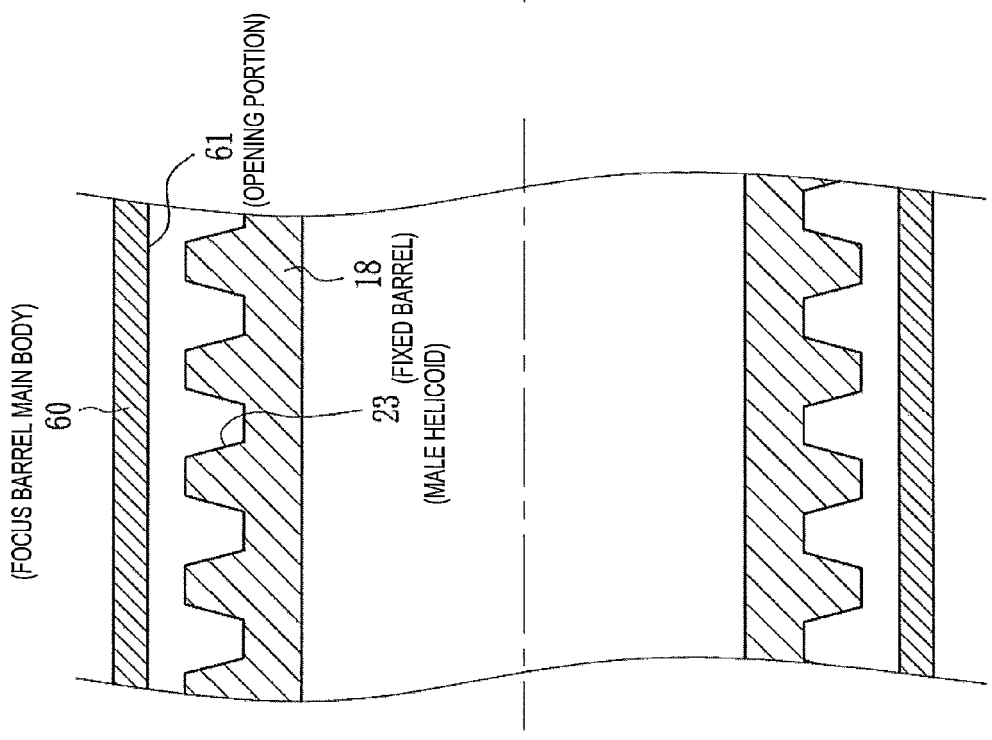

During a curable material filling process 53, the focus barrel main body 60 and the fixed barrel 18 formed in the processes 51 and 52 are set by a fixture or the like so as to be fixed (a state illustrated in FIG. 9A). Here, a peripheral surface of the opening portion 61 is disposed with a predetermined clearance from the male helicoid 23. In addition, the curable material 45 is filled into a clearance between the focus barrel main body 60 and the fixed barrel 18 fixed in this state, that is, the clearance between the male helicoid 23 and the opening portion 61 (a state illustrated in FIG. 9B). As the curable material filling the clearance, a UV-curable adhesive is used.

In a photocuring process 54, the curable material 45 is cured by irradiating the UV rays 47 from an outside of the focus barrel main body 60. The UV rays transmit the focus barrel main body 60 to cure the curable material 45 filled between the male helicoid 23 and the opening portion 61 (a state illustrated in FIG. 10A). Since the fixed barrel 18 is made of the sliding material, the curable material 45 is fixed only to the opening portion 61. As described above, the curable material 45 is strongly attached to the focus barrel main body 60 by roughening the opening portion 61. Accordingly, the male helicoid 23 functions as a mold, and a cured material layer 62 having the female helicoid 24 which is engaged with the male helicoid 23 is formed inside the opening portion 61.

That is, the focus barrel 14 configured with the cured material layer 62 having the female helicoid 24, and the focus barrel main body 60 is formed. In addition, as illustrated in FIG. 10B, when the male and female helicoids 23 and 24 are rotated relative to each other in a direction to be unscrewed from each other, the focus barrel 14 and the fixed barrel 18 are separated from each other.

In the first and second embodiment, as the one member, the fixed barrel 18 is formed integrally with the sliding material. However, the invention is not limited thereto, and a surface of the male helicoid 23 may be formed of a sliding material. For example, a helicoid member main body may be formed of a resin material or a metal material to form a sliding material layer made of a sliding material on the surface of the male helicoid 23. As the sliding material, for example, the sliding material layer is formed by applying grease, Teflon (registered trademark) paint, molybdenum paint, or the like or performing metal plating thereon.

In the first and second embodiments, the fixed barrel 18 represents the one member in which the surface of the male helicoid 23 is made of the sliding material, and the focus barrel 14 represents the other member to which the curable material that is filled into the clearance between the focus barrel 14 and the fixed barrel 18 (the one member) and is then cured is fixed. However, the invention is not limited thereto. The focus barrel 14 may represent the one member in which a surface of a female helicoid is made of the sliding material, and the fixed barrel 18 may represent the other member to which the curable material that is filled into the clearance between the fixed barrel and the focus barrel 14 (the one member) and is then cured is fixed. In addition, in this embodiment, the focus barrel 14 that slidably comes in contact with the outside of the fixed barrel 18 which is the one member represents the other member. However, the other member may also slidably come in contact with the inside of the one member similarly to the lens ranges 25 and 26.

In the embodiments, the focus barrel 14 as the other member, or the focus barrel main body 60 as the main body of the other member as the focus barrel 14, is made of the light-transmissive resin to transmit the UV rays. However, the invention is not limited thereto. Specifically, the fixed barrel 18 as the one member, both the one member and the other member, or one of the one member and the other member, and a main body of a member opposed to this may be made of the light-transmissive resin.

In addition, in the embodiments, the UV-curable adhesive is used as the curable material. However, the invention is not limited thereto, and a photocurable material that is photosensitive to other wavelength ranges, for example, visible light may be employed. In addition, the invention is not limited to the photocurable material, and a thermosetting resin may be used. In this case, the one member and the other member have heat resistance to bear a predetermined temperature when the thermosetting resin is subjected to thermal curing, and instead of the photocuring process, a thermal curing process for heating and curing the filled thermosetting resin is performed.

In addition, in this embodiment, as an example of the male and female helicoids, the helicoid structure formed along a helical path is represented. However, the invention is not limited thereto. For example, a helicoid structure formed along several helical paths may be applied, and a cross-sectional shape of a screw thread of a screw groove is not limited to a trapezoidal shape and may be a triangular shape.

Figure 11:
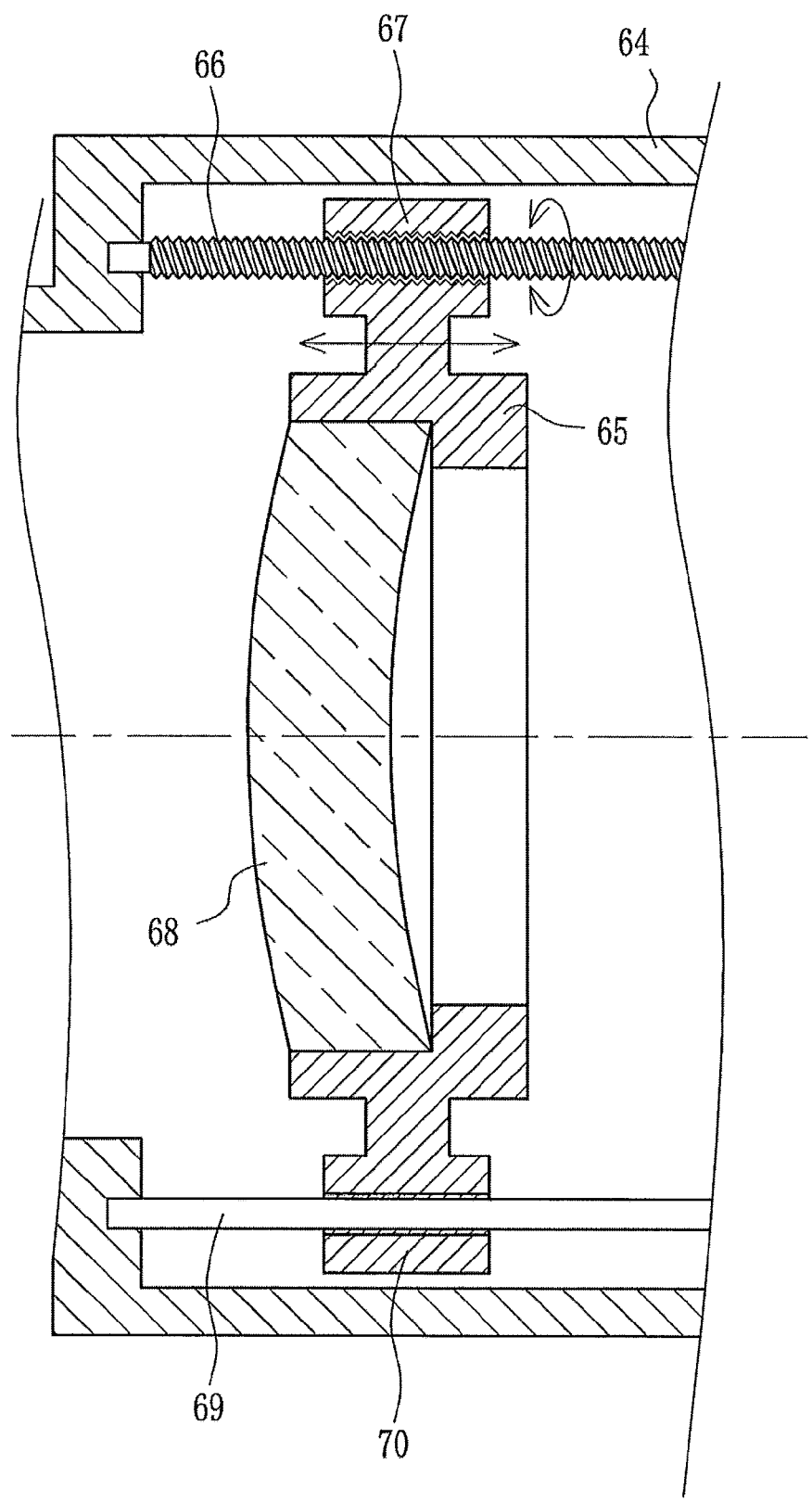
FIG. 11 is a cross-sectional view of a main part of a configuration of a ball screw, a nut, a guide shaft, and a fitting portion.

In addition, a sliding contact member structure in which members are moved relative to each other while slidably coming in contact with each other, is not limited to the helicoid structure illustrated in the first and second embodiments, and a sliding contact member structure including a ball screw and a nut may be applied. In this case, for example, as illustrated in FIG. 11, the invention may be applied to a sliding contact member structure including a ball screw 66 for moving a lens range 65 and a nut 67 which is screwed together with the ball screw 66 and is formed integrally with the lens range 65. The ball screw 66 and the nut 67 are assembled to a fixed barrel 64, the lens range 65 holds a lens 68, and the ball screw 66 is driven by a motor (not shown) to rotate about a center axis. Accordingly, the lens range 65 and the lens 68 along with the nut 67 move straightly according to leads of the ball screw 66 and the nut 67. When the invention is applied to the structure including the ball screw 66 and the nut 67, for example, the ball screw 66 represents the one member in which a surface of a male screw provided on an outer periphery is made of a sliding material, and the nut 67 represents the other member to which a curable material that is filled into a clearance between a female screw provided on an inner periphery of the nut 67 and the male screw of the ball screw 66 (the one member) and is then cured is fixed. Accordingly, the ball screw 66 and the nut 67 move relative to each other while coming in close contact with each other. In addition, the invention is not limited thereto. First, a nut main body without a female screw formed may be provided in advance, a curable material may be filled into a clearance between the nut main body and the male screw of the ball screw 66, and the cured curable material may be fixed to the nut main body to form the nut 67.

Figure 12:
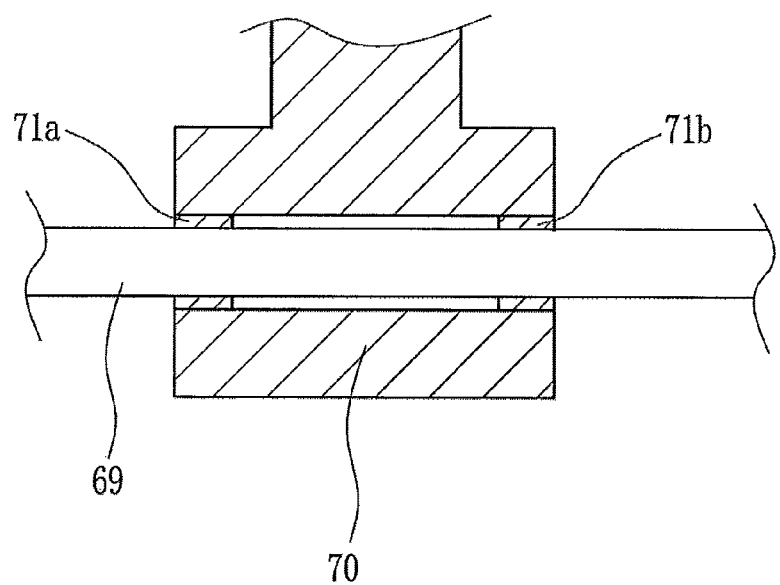
FIG. 12 is a cross-sectional view of a main part of an example in which the curable material is charged into a clearance between the guide shaft and the fitting portion.

In addition, the invention is not limited to the helicoid structure and the structure including the ball screw and the nut, and the invention may be applied to any structure as long as one member and the other member slidably come in contact to move relative to each other. For example, as illustrated in FIG. 11, the invention may be applied to a case where the one member and the other member do not rotate relative to each other but move straightly, such as a sliding contact member structure including a guide shaft 69 which is assembled to the fixed barrel 64 and has a columnar shape for guiding a movement of the lens range 65, and a fitting portion 70 which is fitted to the guide shaft 69 and is formed integrally with the lens range 65. In this case, for example, the guide shaft 69 is the one member of which an outer peripheral surface is made of the sliding material, and the fitting portion 70 is the other member to which the curable material filled into the clearance between the guide shaft 69 and the fitting portion 70 and then cured is fixed. Accordingly, the guide shaft 69 moves relative to the fitting portion 70 while coming in close contact therewith. Furthermore, in this case, a cured material layer may not need to be formed over the entire range where the fitting portion 70 is fitted to the guide shaft 69. As illustrated in FIG. 12, the cured material layer is formed in at least a part of the fitting portion 70 fitted to the guide shaft 69 to come in close contact with the guide shaft 69. In addition, in an example illustrated in FIG. 12, cured material layers 71a and 71b are formed at a front end portion and a rear end portion of the fitting portion 70 in a movement direction to allow the fitting portion 70 to stably move. In addition, the sliding member structure may be applied to an extension-type lens barrel that moves straightly. For example, in a case of a lens barrel structure including cylindrical outer and inner barrels that move relative to each other, the inner barrel is one member in which an outer peripheral surface is made of a sliding material, and the outer barrel is the other member to which a curable material filled into a clearance between the inner and outer barrels and then cured is fixed. Accordingly, the inner and outer barrels move relative to each other while coming in close contact with each other.

Figure 13:
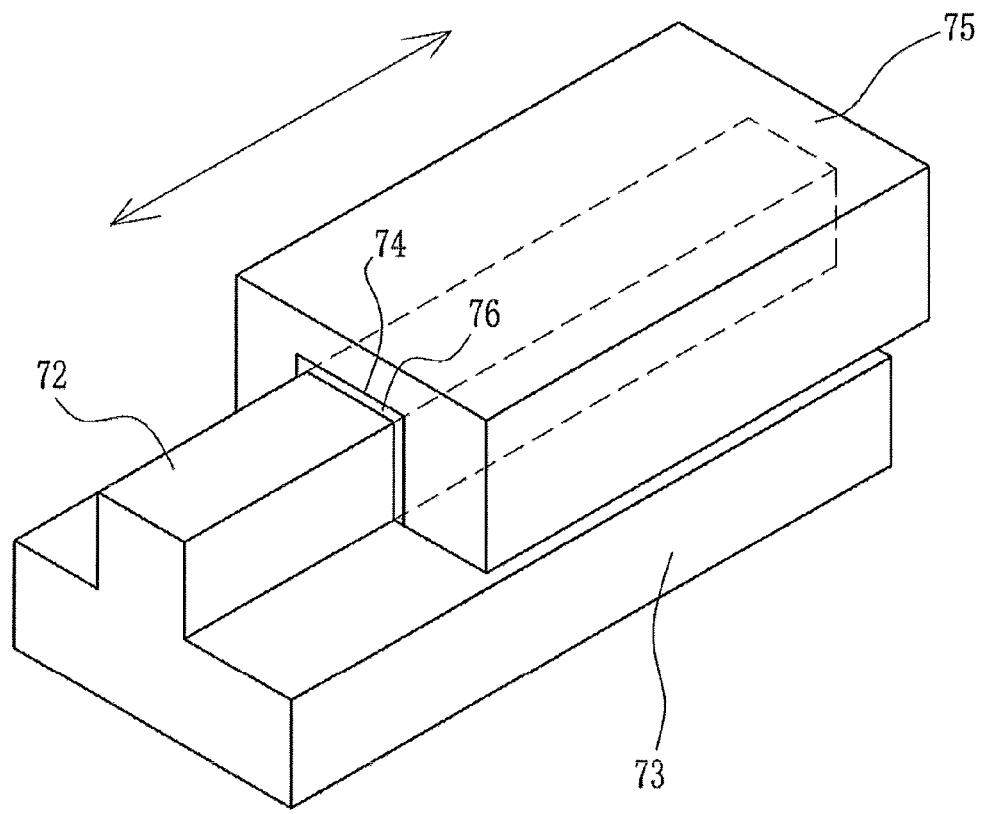
FIG. 13 is a perspective view illustrating an example of a structure in which a key protrusion and a key groove are fitted to each other.

In addition, as the sliding member structure that moves straightly, the invention may be applied to a structure in which a key protrusion and a key groove are fitted to each other. In this case, for example, as illustrated in FIG. 13, a guide piece 73 having a key protrusion 72 is referred to as one member made of a sliding material, and a fitting piece 75 which has a key groove 74 fitted to the key protrusion 72 and to which a cured material layer 76 formed between the key groove 74 and the guide piece 73 is fixed is referred to as the other member. Otherwise, the fitting piece 75 is referred to as the one member and the guide piece 73 is referred to as the other member. In addition, the guide piece 73 and the fitting piece 75 move relative to each other along the key protrusion 72 and the key groove 74. In this case, the curable material that is filled into the clearance between the key protrusion 72 and the key groove 74 and is then cured may be fixed to one of the guide piece 73 and the fitting piece 75 to be separated from the other. Otherwise, a configuration in which, first, a guide piece main body without the key protrusion 72 is formed, and a cured material layer formed by filling the curable material between the guide piece main body and the key groove 74 of the fitting piece 75 and curing the curable material is configured as the key protrusion 72 to be fixed to the guide piece main body may be applied.

In this embodiment, the example applied to the projection lens assembled to the optical device is illustrated. However, as the optical device, any structure for moving a lens in an optical axis direction, for example, a projector, a camera, a telescope, a single lens, and a lens unit (exchange lens) used for a reflex camera may be applied.

What is claimed is:

1. A sliding member structure comprising:
   one member;
   another member; and
   a cured material layer, wherein
   the one member and said another member slidably contact with each other to move relative to each other,
   a surface of the one member in a range where the one member is opposed to said another member is made of a sliding material to which a curable material is not fixed,
   said another member is opposed to the one member with a predetermined clearance therebetween, and
   the cured material layer is formed by curing the curable material filled into at least a part of the clearance between the one member and said another member, and is fixed to a surface of said another member to slide on the one member.

2. The sliding member structure according to claim 1, wherein the curable material is a photocurable adhesive which is cured by light in a predetermined wavelength range, and
   one or both of the one member and said another member transmit the light in the predetermined wavelength range.

3. The sliding member structure according to claim 1, wherein the curable material is a thermosetting resin that is cured when heated to a predetermined temperature, and the one member and said another member have heat resistance to withstand the predetermined temperature.

4. The sliding member structure according to claim 1, wherein the one member is formed integrally with the sliding material.

5. The sliding member structure according to claim 1, wherein the one member includes a main body and a sliding material layer formed on a surface of the main body.

6. The sliding member structure according to claim 1, wherein a surface of said another member, which is opposed to the one member, is subjected to a roughening process.

7. A sliding member structure comprising:
   one member; and
   another member, wherein
   the one member and said another member slidably contact with each other to move relative to each other,
   the one member is made of a sliding material of which a surface in a range where the one member is opposed to said another member is not fixed with a curable material, and
   the other member includes:
   a main body that is opposed to the another member with a predetermined clearance therebetween, and
   a cured material layer which is configured by filling a curable material between the one member and the main body and curing the curable material which is fixed to a surface of the main body, and which slides on the one member.

8. The sliding member structure according to claim 1, wherein the one member and said another member constitute a helicoid structure in which male and female screws are screwed together to rotate relative to each other so as to allow the one member and said another member to move relative to each other in a rotation axis direction.

9. The sliding member structure according to claim 7, wherein the one member and said another member constitute a helicoid structure in which male and female screws are screwed together to rotate relative to each other so as to allow the one member and said another member to move relative to each other in a rotation axis direction.

10. A manufacturing method of a sliding member structure including one member and another member that slidably contact with each other to move relative to each other, the manufacturing method comprising:
    forming the one member so that a surface of the one member in a range where the one member is opposed to said another member has a sliding material layer to which a curable material is not fixed;
    causing the one member and the other member so as to be opposed to each other with a predetermined clearance therebetween and filling a curable material that has fluidity between the one member and said another member; and
    curing the curable material to be fixed to a surface of said another member to form a cured material layer which slidably contacts with the one member.

* * * * *